US006575856B2

(12) United States Patent
Anderson (10) Patent No.: US 6,575,856 B2
(45) Date of Patent: Jun. 10, 2003

(54) VARIABLE DRIVE TRANSMISSION

(76) Inventor: Lawrence A. Anderson, 10023 Winlake Dr., Cincinnati, OH (US) 45231

( * ) Notice: Subject to any disclaimer, the term of this patent is extended or adjusted under 35 U.S.C. 154(b) by 0 days.

(21) Appl. No.: 09/858,434

(22) Filed: May 16, 2001

(65) Prior Publication Data

US 2003/0050139 A1 Mar. 13, 2003

(51) Int. Cl.[7] .................................................. F16H 9/08
(52) U.S. Cl. ...................................................... 474/83
(58) Field of Search ......................... 474/3, 6, 53, 55, 474/78, 83, 119

(56) References Cited

U.S. PATENT DOCUMENTS

| 837,651 A | * | 12/1906 | Wandless ..................... 474/53 |
| 944,585 A | | 12/1909 | Watson |
| 1,160,414 A | * | 11/1915 | Kelsey ........................ 474/53 |
| 1,379,504 A | * | 5/1921 | Young ......................... 474/53 |
| 1,446,294 A | * | 2/1923 | Healey ........................ 474/53 |
| 2,344,341 A | * | 3/1944 | Coen ........................... 474/53 |
| 2,801,547 A | | 8/1957 | Guibert ....................... 74/217 |
| 3,021,717 A | | 2/1962 | Bondurant ................... 74/217 |
| 3,613,468 A | * | 10/1971 | Rand .......................... 474/50 |
| 3,906,809 A | | 9/1975 | Erickson ................. 74/217 S |
| 4,842,569 A | | 6/1989 | Orr ............................. 474/83 |
| 5,226,854 A | | 7/1993 | Hauser ........................ 474/83 |
| 6,135,907 A | | 10/2000 | Hong .......................... 474/148 |

FOREIGN PATENT DOCUMENTS

| CH | 153265 | 3/1932 |
| FR | 409584 | 4/1910 |
| FR | 493023 | 4/1919 |

* cited by examiner

Primary Examiner—Thomas R. Hannon
Assistant Examiner—Vicky A. Johnson
(74) Attorney, Agent, or Firm—Frost Brown Todd LLC (57) ABSTRACT

An infinitely variable ratio transmission having a pair of oppositely oriented conical torque input and output members wherein the conical members include multi-angled conical surfaces. Further the conical members include longitudinal floating sprocket bars which combined with the multi angled conical surfaces compensate for the effect of an inextensible drive belt as the drive belt is axially moved along the longitudinal length of the torque input and output members.

22 Claims, 7 Drawing Sheets

VARIABLE DRIVE TRANSMISSION

BACKGROUND OF THE INVENTION

The present invention generally relates to a power transmission whereby the input speed, from a constant velocity, prime mover, such as an automotive engine, or any other suitable power source, may be reduced to a desired output speed by the internal workings of the transmission.

More specifically the present invention relates to an infinitely variable ratio drive mechanism, of the endless belt type, having a pair of rotating conical members configured to have parallel longitudinal axis with the smaller diameter of one conical member adjacent to the larger diameter of the other. An endless, inextensible, belt encircles and drivingly engages both conical members whereby power may be transmitted from one conical member to the other. A variable speed reduction, between the conical members, is obtained by selectively moving the endless belt along the longitudinal axis of the conical members during power transmission.

It has been well known to use opposing conical members as the driving member and the driven member in power transmissions as evidenced by the following U.S. Pat. Nos. 944,585; 2,801,547; 3,021,717; 3,906,809; 4,842,569; and 5,226,854.

All of the above references employ conical members having a single fixed, conical angle. However, as the belt or chain moves axially away from the longitudinal center, where the cone diameters are equal, the total peripheral belt length required to encircle the conical members increases as a function of the axial distance from the longitudinal center. Therefore, either the belt must be elastic or some other means must be employed to accommodate the inherent peripheral variation. Providing an elastic belt results in losses of power transmission efficiencies Therefore, some other mechanical solution is preferred.

SUMMARY OF THE INVENTION

The present invention relieves the belt length problem by providing conical members having, at least, two conical angles. A first cone angle is employed from the large diameter end of the conical member to its mid longitudinal position, and a second, slightly larger cone angle is employed from the mid point of the conical member to its small diameter end. Alternatively the conical surface of the conical members may be replaced with a curved surface whereby the peripheral length of the drive belt is constant for all positions along the longitudinal length of the drive members.

Further the present invention teaches novel, free floating sprocket bars spaced about the periphery of the conical members and extending longitudinally (axially) along the surface thereof. The sprocket bars generally parallel the surface of the conical members. However, the sprocket bars may take any other convenient shape, such as a convex configuration, as described further below. By being free floating, the sprocket bars freely move diametrically and circumferentially whereby they may fully engage a beaded or other suitably configured and generally inelastic, inextensible drive chain.

DETAILED DESCRIPTION OF THE INVENTION

Referring now to figures 1 through 4, figure 1 presents a diagrammatic view of the basic elements of my invention. A pair of rotatable, elongated, conical sprocket wheel assemblies 12 and 14 are positioned on parallel axis 16 and 18 and spaced apart at any convenient distance L.

Figures 1, 8:
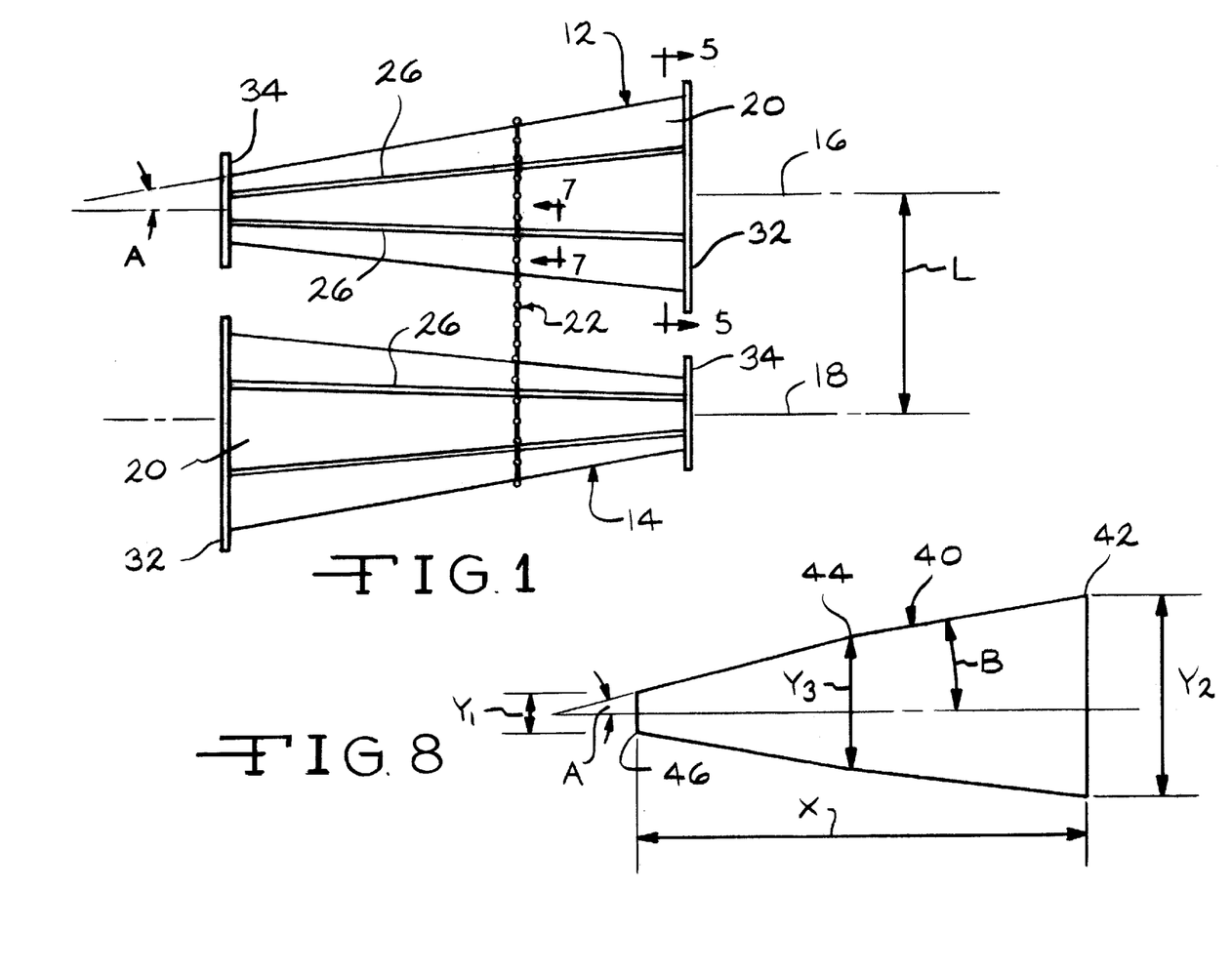
FIG. 1 presents a schematic view of the primary elements of my new and improved transmission.
FIG. 8 presents a schematic view of an alternate embodiment for the conical members illustrated in FIG. 1, illustrating the dual conical angle profile.
Figure 2:
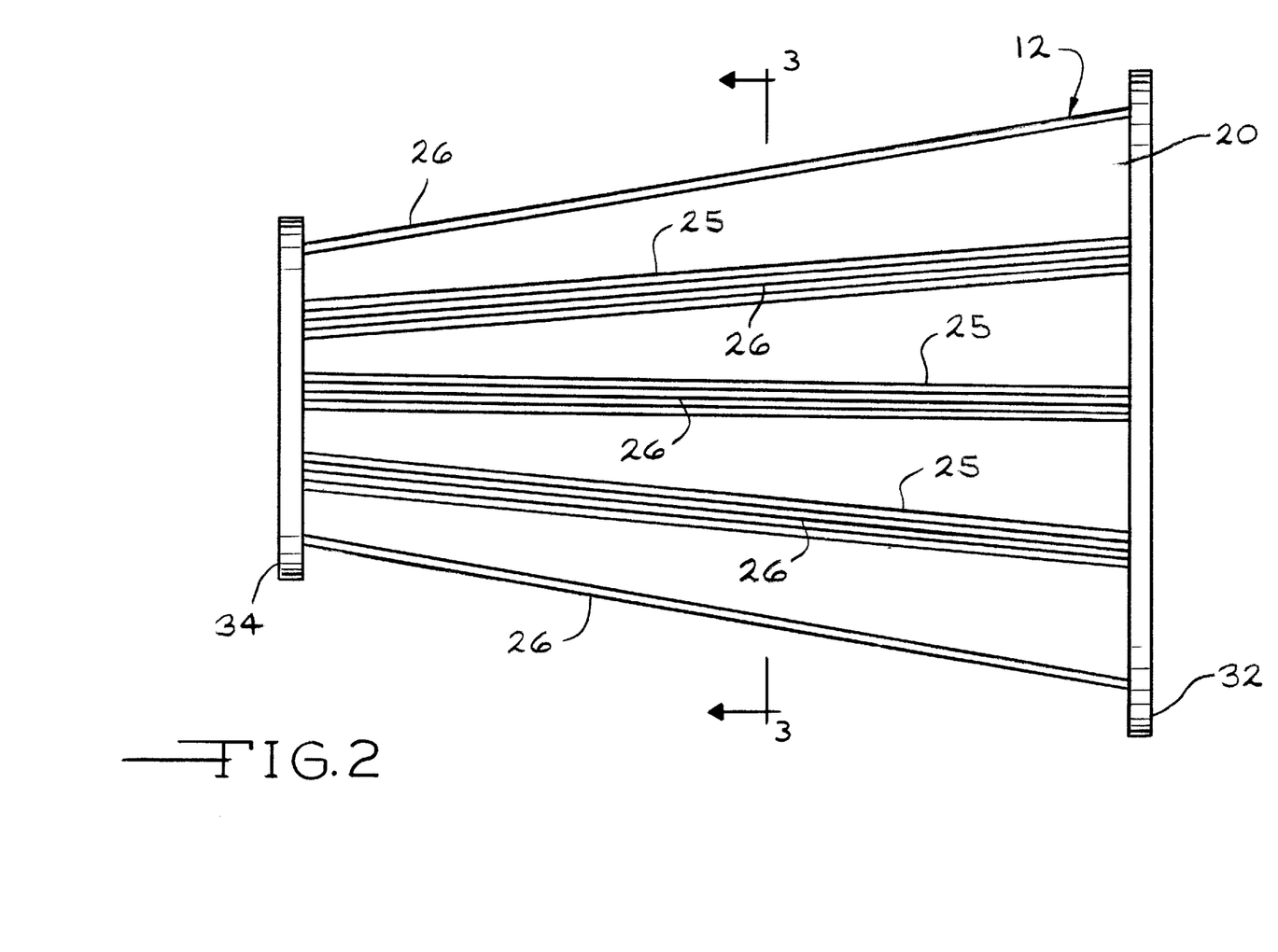
FIG. 2 is an isolated schematic view of one of the conical members of the transmission as shown in FIG. 1.

Since the structure of sprocket wheel assemblies 12 and 14 are identical, a detailed description of sprocket wheel assembly 12 will generally follow with the understanding that both sprocket wheel assemblies 12 and 14 are, in fact, identical in structure and function, and generally interchangeable. Sprocket wheel assembly 12 generally comprises a truncated cone 20, which may be hollow or solid depending upon end use and/or application.

Generally, power input to the system will be through a primary or driving sprocket wheel 12 and transmitted to the secondary driven sprocket wheel 14 by way of an endless belt (preferably a notched belt) or beaded chain assembly type of element 22 encircling both the driving sprocket wheel 12 and the driven sprocket wheel 14 as illustrated in FIG. 1.

Sprocket wheels 12 and 14 include axially directed groove like channels 25 receiving therein elongated sprocket bars or cogs 26. Channels 25 are circumferentially wider than sprocket bars 26 thereby permitting circumferential movement of sprocket bar 26 within channel 25 as will be discussed further below. Further, sprocket bars 26 are resiliently received within channels 25 by action of compression spring 28, or any other suitable elastic element, positioned between sprocket bar 26 and the bottom of channel 25. Thereby biasing sprocket bar 26 radially outward whereby, as illustrated in FIG. 6, compression spring 28 forces sprocket bars 26 radially outward into groove 38 of ring gear 32 thereby causing sprocket bar 26 to be self centering when not engaged with drive chain 22.

Figures 5, 6, 7:
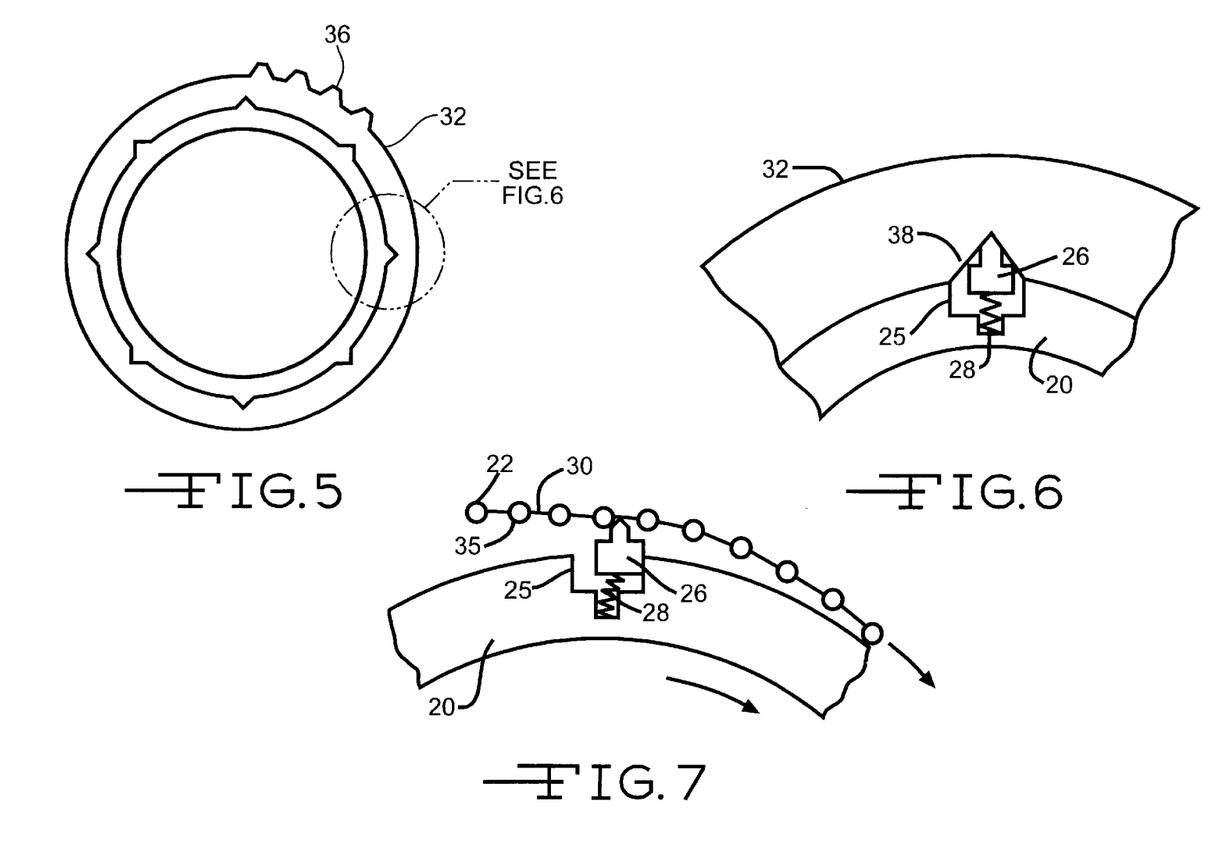
FIG. 5 presents a crossectional view taken along line 5—5 in FIG. 1.
FIG. 6 is an enlarged view of the circled area in FIG. 5.
FIG. 7 present a crossectional view taken along line 7—7 in FIG. 1.

With reference to FIGS. 5 and 6 sprocket wheels 12 and 14 include, at each axial end thereof ring gears 32 and 34 each having circumscribing gear teeth 36 thereabout. Each ring gear circumscribes its associated sprocket wheel and is rigidly affixed thereto whereby driving torque is transmitted between the ring gear and its associated sprocket wheel. Each ring gear includes "V" shaped grooves 38 aligned with and receiving therein each sprocket bar 26 thereby retaining each sprocket bar within its associated channel 25 and acting to center sprocket bar 26, within channel 25, as the sprocket bar is thrust upward into the groove. The ring gears may be appropriately geared to other internal workings of the transmission whereby input torque may be input to the transmission and output torque delivered from the transmission. Alternatively sprocket wheels 12 and 14 may be directly affixed to the transmission input and output shaft of the transmission.

Figures 3, 4, 4A:
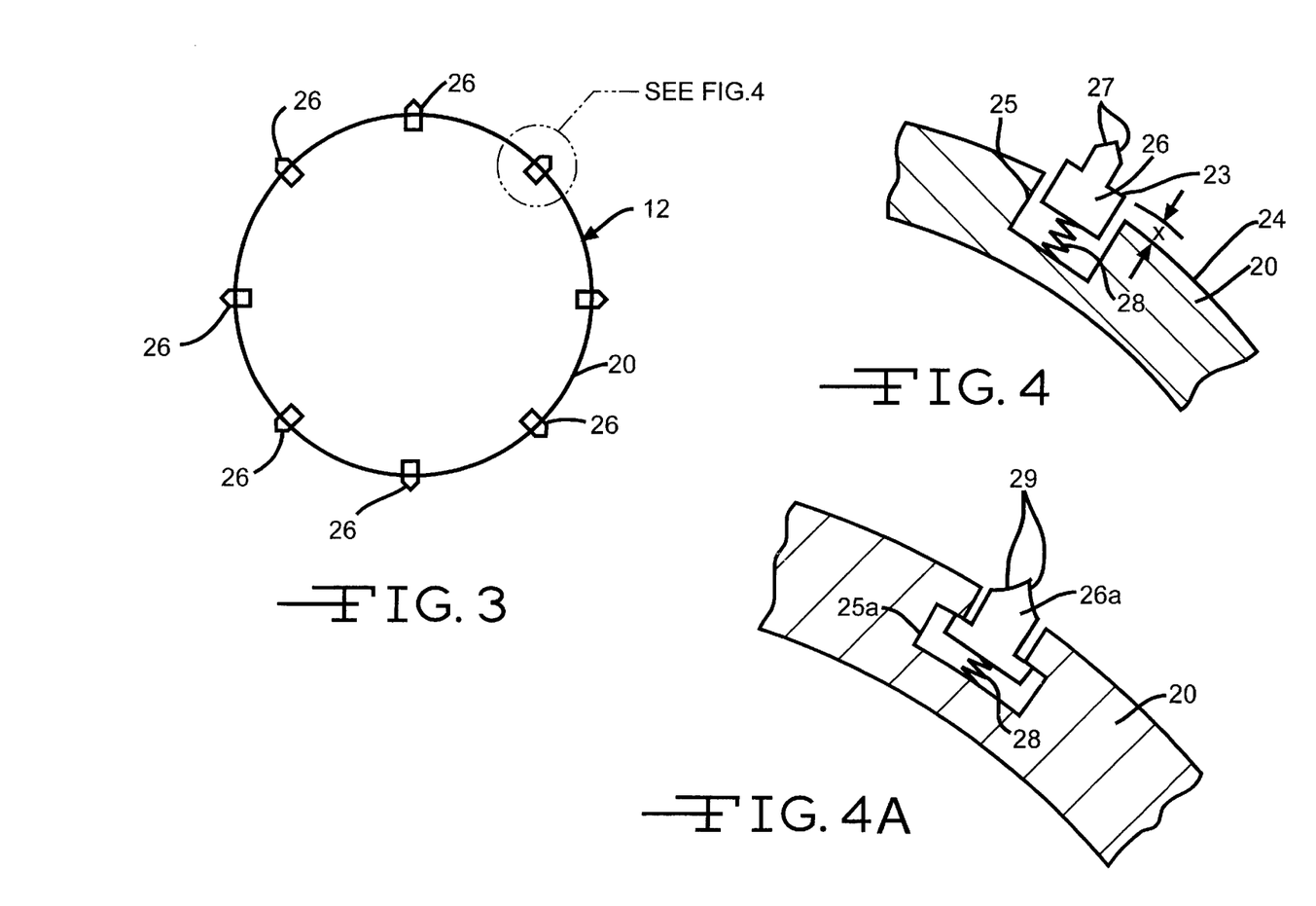
FIG. 3 is a crossectional view taken along line 3—3 in FIG. 2.
FIG. 4 is an enlarged view of the circled area in FIG. 3.
FIG. 4A presents an alternate embodiment of the circled area in FIG. 3.

Alternatively, channels 25 may be shaped as an inverted "T" and sprocket bars 26 provided a complimentary "T" shape whereby the channel configuration 25A would retain sprocket bar 26A therein as shown in FIG. 4A. Similarly, any other type of known complimentary configurations might be used for retaining sprocket bars 26 within channels 25 such as a wedge shaped configuration (not shown).

Sprocket bars 26 may be configured, as illustrated in FIG. 4, with a wedge shaped top having straight, or flat surfaces 27 or, as illustrated in FIG. 4A, having scalloped surfaces 29. The exact configuration of the sprocket bars will necessarily vary depending upon the application for which they are being used. Shoulder 23 of sprocket bar 26 preferably extends a distance x above the surface 24 of the sprocket wheel, as illustrated in FIG. 4. In operation, beads 35 will rest upon shoulder 23 when engaging the sprocket bar. The floatability of the sprocket bar, in the radial direction, may also compensate for the excess length of the drive chain, as the chain moves away from the sprocket wheel midpoint, by floating the drive chain above the surface 24 of the sprocket wheel.

Referring now to FIGS. 1 and 7. It is assumed for the following operational discussion that sprocket wheel 12 is the driving wheel and sprocket wheel 14 is the driven wheel. Driving torque is transferred from the transmission input means (not shown) to ring gears 32 and 34 on sprocket wheel 12. By chain drive the driving torque is transferred to sprocket wheel 14 through beaded drive chain 22. The output torque is then transferred to the transmission output shaft (not shown) by way of ring gears 32 and 34 on the driven sprocket wheel 14. When drive chain 22 is at the exact mid point of sprocket wheels 12 and 14 the gear ratio between sprocket wheel 12 and 14 will be 1 to 1.

However when drive chain 22 is shifted to the right, as viewed in FIG. 1, the gear ratio between sprocket wheel 12 and sprocket wheel 14 will be less than 1, with the exact ratio being dependent upon the given axial location of drive chain 22. Thus sprocket wheel 14 will be turning at a faster RPM than sprocket wheel 12.

Similarly, if drive chain 22 is moved to the left, as viewed in FIG. 1, the gear ratio between sprocket wheel 12 and sprocket wheel 14 will be greater than one, depending upon the specific axial location of drive chain 22. Any convenient apparatus may be used to longitudinally move drive belt 22. For example see U.S. Pat. No. 3,021,717.

Except for the floating sprocket bars, many prior patents teach the above basic principle. For example see U.S. Pat. Nos. 944,585; 2,801,547; 3,021,717; 4,842,569; 5,226,864; and 6,135,907.

However, as drive chain 22 moves axially away from the axial mid point, the required length of drive chain 22 necessary to wrap about sprocket wheel 12 and 14 increases and is dependent upon the specific axial location of drive chain 22. Namely, the length of drive chain 22 necessary to wrap about sprocket wheel 12 and 14, plus bridge the gap between the sprocket wheels is a function of axial location. Prior art patents generally teach using an elastic drive belt of some type to accommodate this problem.

Figures 10, 11:
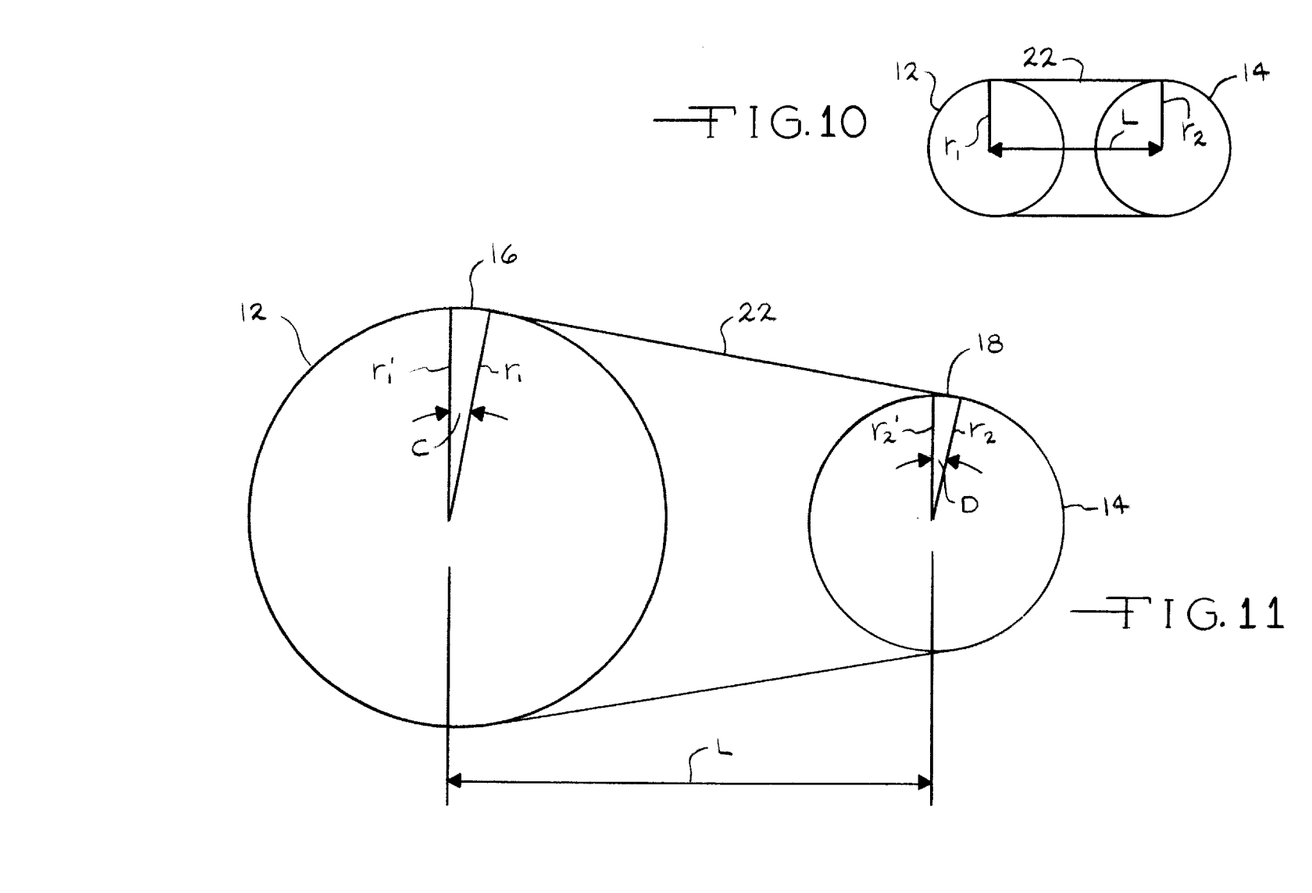
FIG. 10 presents a diagrammatic, crossectional view of the drive belt at the longitudinal midpoint of the conical members.
FIG. 11 presents a diagrammatic, crossectional view of the drive belt at a longitudinal location, on the conical members, other than the midpoint.

For an explanation of this phenomena consider FIGS. 10 and 11. FIG. 10 illustrates drive chain 22 positioned at the longitudinal midpoint of sprocket wheel 12 and 14. At the longitudinal midpoint chain 22 wraps about sprocket wheels 12 and 14 a full 180 degrees. Thus the length of the drive chain 22 necessary to wrap about both wheels 12 an 14 is equal to the circumference of one sprocket wheel plus twice the axial offset L. However, as drive chain 22 is moved away from the longitudinal midpoint, as illustrated in FIG. 11, chain 22 wraps sprocket wheel 12 180 degrees plus twice angle C. However, on sprocket wheel 14, chain 22 wraps the wheel 180 degrees minus twice angle D. Radius r1 and r2 are parallel since they are perpendicular, by definition, to belt 22; and radius r1' and r2' are also parallel since they are perpendicular to belt 22 in FIG. 10. Therefore, angles C and D are equal as they are formed by a air of intersecting parallel lines.

Thus for chain 22 to wrap about sprocket wheels 12 and 14, the length of chain 22 will necessarily be different than the length of chain 22 in FIG. 10. The length of arc 16 and 18 is equal to a constant times the radius r1 and r2 respectively, where the constant is a function of the arc's angle (C and/or D). However, since angle C equals angle D the constant is identical. Therefore arcs 16 and 18 are a function of, and differ only by the difference of radius r1 and r2. Thus it is apparent that arc 16 is larger than arc 18. Therefore the length of chain 22 must increase by the difference in the lengths of arc 16 and 18. As drive chain 22 moves from the longitudinal midpoint to either extreme longitudinal location the difference between arc 16 and 18 progressively increases.

By experimentation I have found that an inextensible, beaded chain, as illustrated in FIGS. 1 and 7, may be successfully used if the sprocket bars 26, as illustrated herein, are free to move, or float, within channels 25 in both the radial and the circumferential direction and dual angled conical members are employed as described below.

Figure 9:
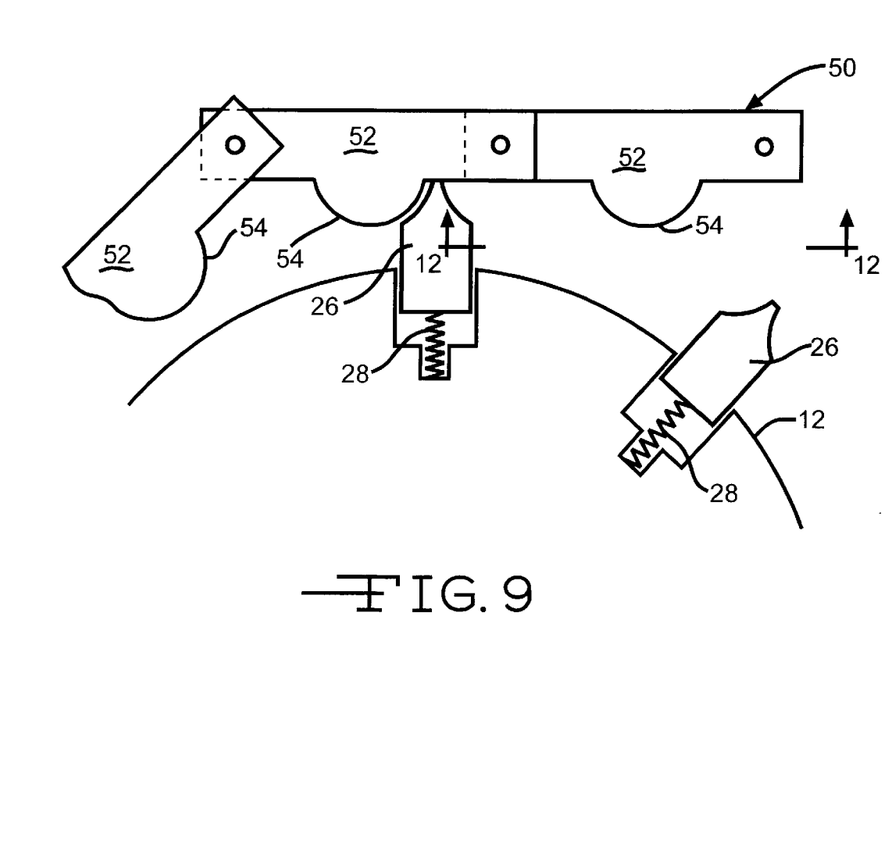
FIG. 9 presents an alternate embodiment for the drive chain as shown in FIGS. 1 and 7.

Referring to FIG. 7, when using a beaded chain as illustrated, wherein a given gap 30 separates beads 35 one may not be certain that as chain 22 wraps around the sprocket wheel 12 or 14 that the sprocket bars will always be positioned between two adjacent beads. However, by permitting the sprocket bar 26 to move radially inward and/or shift circumferentially, if a bead 35 impinges upon a sprocket bar as chain 22 wraps about the sprocket wheel, sprocket bar 26 may move to accommodate the fixed position of the bead, as illustrated in FIG. 7, and thereby transmit torque to chain 22. Although the drive chain embodiment illustrated herein comprises a beaded chain, other inextensible chain, and/or belt, configurations are feasible. For example, FIG. 9 illustrates an alternate embodiment for drive chain 22 wherein a portion of linked chain 50 is illustrated having hinged, or pivoting links 52. Each link 52 includes a spherical portion 54 for engagement with sprocket bars 26.

Further I have discovered that it is desirable that sprocket wheels 12 and 14 are configured with a double cone angle as illustrated in FIG. 8. Referring to FIG. 8, sprocket wheel 40 includes a first conical angle A from the smaller diameter 46 to mid point 44 and a smaller conical angle B from mid point. 44 to the large diameter 42. By this technique the difference between arc 16 and arc 18 (FIG. 11) may be lessened and combined with the movable sprocket bars, as taught above, will provide for matching a pair of sprocket wheels that will function with and/or accommodate an inextensible drive belt. Further, it is conceivable that a multiple number (three or more) of cone angles may be employed from one end 46.

Although four equally spaced sprocket bars are illustrated for teaching my invention herein any number of sprocket bars may be used. Further it may be advantageous, in some applications, to space sprocket bars 26 unevenly about the circumference of the sprocket wheels. Also, for particular end uses, it may be desirable to have different sprocket bar arrangements for each conical surface of the sprocket wheel.

I have constructed and successfully tested a prototype unit (see FIG. 8) having two sprocket wheels wherein the longitudinal length x of each sprocket wheel is 25.4 cm. (10 inches) and wherein the small end diameter y1 equals 5.08 cm. (2 inches) and the large diameter end y2 equals 9.89 cm. (3.89 inches). The midpoint diameter y3 is 7.62 cm. (3 inches). Thus cone angle A is approximately 11.333 degrees and cone angle B is approximately 10.66 degrees. Eight equally spaced sprocket bars, of the design as illustrated in FIGS. 4 and 6, were used along with a beaded chain similar to that of a typical electric lamp "pull chain." The chain is comprised of $3/16^{th}$ inch beads spaced ¼ inches apart. Channels 25 are approximately 9 mm. wide and 6 mm. deep, with sprocket bars approximately 6 mm. wide and 6 mm. high.

Although a double cone configuration was used to construct the prototype unit described above it is also conceivable that for a given end use application, a smooth geometric curve may be developed for use from the longitudinal midpoint of each sprocket wheel to either the large diameter end, or the small diameter end, or both, or one continuous curve might be developed extending from the small diameter end of each sprocket wheel to the large diameter end.

Figure 14:
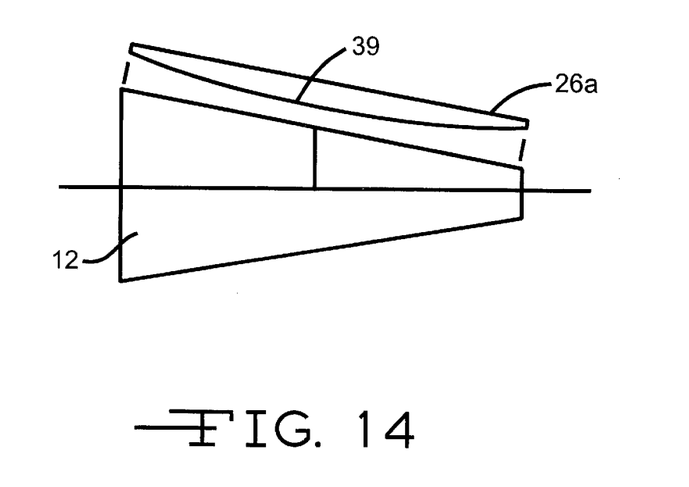
FIG. 14 presents a schematic view of an alternate embodiment wherein a conical member has convexly configured sprocket bars.

FIG. 14 presents an additional alternate embodiment wherein a free floating, convexly configured sprocket bar 26A is illustrated. Although no testing of this alternate embodiment has been carried out, it is believed that use of a, free floating sprocket bar having a convex configuration, as illustrated in FIG. 14, may duplicate the affect of the multi tapered cone taught above. The high point 39 of the convexity would be located at the midpoint of the conical drive wheel 12.

Figure 13:
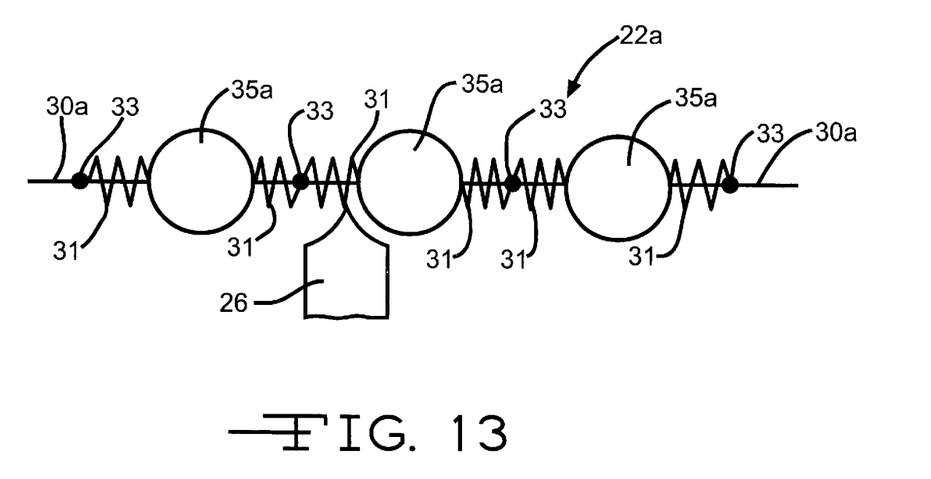
FIG. 13 presents an alternate embodiment, of my invention, wherein the beaded drive chain includes floating beads.

Although the embodiment as taught above is believed to be the most preferred embodiment of the invention, FIG. 13 schematically illustrates an alternate embodiment wherein the drive chain 22A includes movable beads 35A slidingly received on a continuous, inextensible, runner, band or cable, 30A. Positioned upon runner 30a are equally spaced hard stops 33 rigidly affixed to runner 30A. A locating spring, or any other suitable resilient means, 31 positions beads 35A midway between the hard stops. Thus both the sprocket bar 26 and movable bead 35A may cooperatingly shift circumferentially to accommodate the fixed, inextensible length of drive chain 30.

A further alternate embodiment may comprise a flexible drive chain as taught immediately above, wherein sprocket bar 26, having only one degree of freedom, is free to move radially, but not circumferentially whereby the free float of beads 35A accommodate the fixed inextensible drive chain length.

Figure 12:
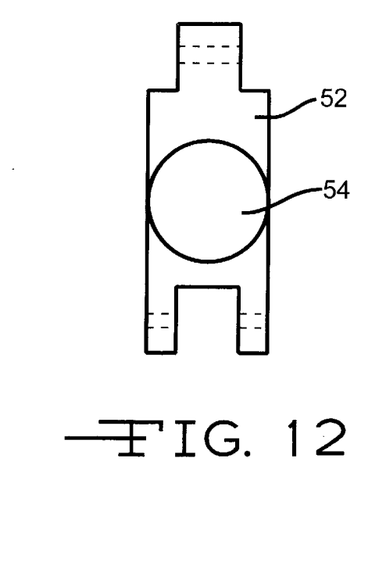
FIG. 12 presents a view taken along line 12—12 in FIG. 9.

Similar to the free floating beads 35A, as taught immediately above, the spherical portion 54 of chain link 50, in FIGS. 9 and 12, may be modified to be free floating within link 50.

While I have described above the principles of my invention in connection with specific embodiments, it is to be clearly understood that this description is made only by way of example and not as a limitation of the scope of my invention as set forth in the accompanying claims.

I claim:

1. In an infinitely variable ratio transmission having a first conical torque input member and second conical torque output member, wherein said second conical member is oriented with respect to said first conical member such that the axis of rotation of said second conical member is parallel to said axis of rotation of said first conical member and wherein the smaller diameter end of said second conical member is adjacent the larger diameter end of said first conical member, wherein said input torque is transferred from said first conical member to said second conical member by an inelastic, endless belt means the improvement comprising:

a) a multiplicity of axially extending channels circumferentially spaced over the external peripheral surface of said conical members, b) a sprocket bar positioned in each of said axially extending channels for engaging said belt means and wherein said sprocket bars are free to move in both the radial and circumferential directions within said channel, c) resilient means positioned between said sprocket bars and their associated channel bottom whereby said sprocket bar is biased radially outward from said conical member.

2. The improvement as claimed in claim 1 wherein said inelastic endless belt means comprises a beaded chain.

3. The improvement as claimed in claim 1 wherein said inelastic endless belt means comprises a linked chain.

4. The improvement as claimed in claim 1 wherein said conical members comprise a first conical angle extending from the smaller diameter end to the longitudinal midpoint of said conical member and a second conical angle extending from said longitudinal midpoint to the large diameter end of said conical member.

5. The improvement as claimed in claim 4 wherein said first conical angle is greater than said second conical angle.

6. The improvement as claimed in claim 5 wherein said second conical angle lies within the range of four to ten percent smaller than said first conical angle.

7. The improvement as claimed in claim 6 wherein said second conical angle is six percent smaller than said first conical angle.

8. The improvement as claimed in claim 1 wherein said conical members include three or more conical angles and wherein said conical angles progressively decrease from the small diameter end of said conical member to the large diameter end of said conical member.

9. The improvement as claimed in claim 1 wherein said sprocket bar includes an axially extending, sprocket bar having a convex bottom surface wherein the high point of said convexity is positioned at the longitudinal midpoint of said conical members.

10. An infinitely variable ratio drive transmission comprising:

a) a conical torque input member and conical torque output member, wherein said conical members are oriented with respect to one another such that the axis of rotation of said torque input conical member is parallel to said axis of rotation of said torque output conical member and wherein the smaller diameter end of said torque input conical member is adjacent the larger diameter end of said torque output conical member, b) a generally inelastic, inextensible, endless belt means circumscribing said conical input torque member and said conical torque output member whereby said input torque is transferred from said conical torque input member to said conical torque output member, c) a multiplicity of axially extending channels circumferentially spaced over the external peripheral surface of said conical members, d) a sprocket bar positioned in each of said axially extending channels for engaging said belt means and wherein said sprocket bars are free to move in both the radial and circumferential directions within said channel, e) resilient means positioned between said sprocket bars and their associated channel bottom whereby said sprocket bar is biased radially outward from said conical member.

11. The transmission as claimed in claim 10 wherein said inelastic endless belt means comprises a beaded chain.

12. The transmission as claimed in claim 11 wherein said beaded chain includes floating beads.

13. The transmission as claimed in claim 10 wherein said inelastic endless belt means comprises a linked chain.

14. The transmission as claimed in claim 10 wherein said conical members comprise a first conical angle extending from the smaller diameter end to the longitudinal midpoint of said conical member and a second conical angle extending from said longitudinal midpoint to the large diameter end of said conical member.

15. The transmission as claimed in claim 14 wherein said first conical angle is greater than said second conical angle.

16. The transmission as claimed in claim 15 wherein said second conical angle lies within the range of four to ten percent smaller than said first conical angle.

17. The transmission as claimed in claim 16 wherein said second conical angle is six percent smaller than said first conical angle.

18. The transmission as claimed in claim 10 wherein said conical members include three or more conical angles and wherein said conical angles progressively decrease from the small diameter end of said conical member to the large diameter end of said conical member.

19. An infinitely variable ratio drive transmission comprising:

a) an elongated torque input member and a matching torque output member, said torque input and output members each comprising an elongated body of revolution having a first end and a longitudinally opposed second end wherein the diameter of said first end is smaller than the diameter of said second end, and wherein the axis of said first member is parallel to said second member, said torque input and output members orientated such that the first end of said torque input member is adjacent to said second end of said torque output member, b) a non-elastic, endless belt means circumscribing said input torque member and said torque output member whereby said input torque is transferred from said torque input member to said torque output member, c) a multiplicity of axially extending channels circumferentially spaced over the external peripheral surface of said torque input and output members, d) a sprocket bar positioned in each of said axially extending channels for engaging said belt means and wherein said sprocket bars are free to move in both the radial and circumferential directions within said channel, e) resilient means positioned between said sprocket bars and their associated channel bottom whereby said sprocket bar is biased radially outward from said torque input and output member.

20. The transmission as claimed in claim 19 wherein said body of revolution comprises a curved surface extending from said first end to said second end.

21. The transmission as claimed in claim 20 wherein the slope of the curved surface progressively decreases from said first end to said second end.

22. An infinitely variable ratio drive transmission comprising:

f) an elongated torque input member and a matching torque output member, said torque input and output members each comprising an elongated body of revolution having a first end and a longitudinally opposed second end wherein the diameter of said first end is smaller than the diameter of said second end, and wherein the axis of said first member is parallel to said second member, said torque input and output members orientated such that the first end of said torque input member is adjacent to said second end of said torque output member, g) an inelastic, endless belt means circumscribing said input torque member and said torque output member whereby said input torque is transferred from said torque input member to said torque output member, said belt means including an inelastic runner having a multiplicity of free floating beads thereon, h) a multiplicity of axially extending channels circumferentially spaced over the external peripheral surface of said torque input and output members, i) a sprocket bar positioned within each of said axially extending channels for engaging said belt means and wherein, j) resilient means positioned between said sprocket bars and their associated channel bottom whereby said sprocket bar is biased radially outward from said torque input and output member.

\* \* \* \* \*